(12) United States Patent
Chien et al.

(10) Patent No.: US 9,793,743 B2
(45) Date of Patent: Oct. 17, 2017

(54) WIRELESS CHARGING DEVICE FOR CHARGING A PLURALITY OF WIRELESS POWER RECEIVING APPARATUS AND CHARGING METHOD THEREOF

(71) Applicant: TDK TAIWAN Corporation, Taipei (TW)

(72) Inventors: Feng-Lung Chien, Yangmei Taoyuan (TW); Mao-Chun Chen, Yangmei Taoyuan (TW); Chien-Hung Lin, Yangmei Taoyuan (TW); Sheng-Tai Hsu, Yangmei Taoyuan (TW); Ni-Ni Lai, Yangmei Taoyuan (TW); Hsiang-Huims Hsu, Yangmei Taoyuan (TW)

(73) Assignee: TDK Taiwan Corporation, Taipei (TW)

( * ) Notice: Subject to any disclaimer, the term of this patent is extended or adjusted under 35 U.S.C. 154(b) by 203 days.

(21) Appl. No.: 14/799,077

(22) Filed: Jul. 14, 2015

(65) Prior Publication Data
US 2017/0018947 A1    Jan. 19, 2017

(51) Int. Cl.
*H01M 10/46* (2006.01)
*H02J 7/02* (2016.01)
*H02J 7/04* (2006.01)
*H01F 27/02* (2006.01)
*H01F 27/255* (2006.01)
*H01F 38/14* (2006.01)
*H01F 27/28* (2006.01)

(52) U.S. Cl.
CPC .............. *H02J 7/025* (2013.01); *H01F 27/02* (2013.01); *H01F 27/255* (2013.01); *H01F 38/14* (2013.01); *H02J 7/04* (2013.01); *H01F 27/2871* (2013.01)

(58) Field of Classification Search
CPC .......... H02J 7/025; H02J 7/0045; H02J 5/005; H02J 7/355; H02J 7/0042
USPC .................. 320/107, 108, 114, 115; 307/104
See application file for complete search history.

(56) References Cited

U.S. PATENT DOCUMENTS

| | | | | |
|---|---|---|---|---|
| 5,550,452 A | * | 8/1996 | Shirai | H02J 7/025 320/108 |
| 2009/0238342 A1 | * | 9/2009 | Bettouyashiki | G03B 42/025 378/167 |
| 2011/0248673 A1 | * | 10/2011 | Aerts | H02J 7/025 320/108 |

* cited by examiner

*Primary Examiner* — Edward Tso
(74) *Attorney, Agent, or Firm* — Muncy, Geissler, Olds & Lowe, P.C.

(57) ABSTRACT

A wireless charging device includes a transmitting-end ferrite core and a transmitting-end coil, wherein the transmitting-end ferrite core have a bottom plate and two upright plates for forming a U-shaped structure defining a charging space therein. One or more wireless power receiving apparatus is put in the charging space. The wireless power receiving apparatus includes a receiving-end coil and a receiving-end ferrite plate, wherein the receiving-end ferrite plate is vertical to the two upright plates. When electrical current flows through the transmitting-end coil to generate an electromagnetic field in the charging space, the electromagnetic field via the two upright plates goes through each of the receiving-end ferrite plates to form an electromagnetic loop. Each of the receiving-end coils generates a charging electrical current induced by the electromagnetic field. Therefore, the present invention can achieve wireless charging to more than one wireless power receiving apparatus at the same time.

35 Claims, 9 Drawing Sheets

WIRELESS CHARGING DEVICE FOR CHARGING A PLURALITY OF WIRELESS POWER RECEIVING APPARATUS AND CHARGING METHOD THEREOF

BACKGROUND OF THE INVENTION

Field of the Invention

The present invention relates to a wireless charging device and charging method thereof, especially to a wireless charging device for charging a plurality of wireless power receiving apparatus and charging method thereof.

Description of the Prior Art

FIG. 1 is a schematic diagram showing the prior-art wireless charging device. The shown wireless charging device comprises a power transmitting end 10 and a power receiving end 20. The power transmitting end 10 comprises a transmitting-end coil 11 and a transmitting-end ferrite plate 12. The power receiving end 20 correspondingly comprises a receiving-end coil 21 and a receiving-end ferrite plate 22. When the power receiving end 20 is in proximity of the power transmitting end 10 and electrical current flows through the transmitting-end coil 11 to generate electromagnetic field, the receiving-end coil 21 of the power receiving end 20 will generate electrical current induced by the electromagnetic field generated by the transmitting-end coil 11 to achieve wireless charging.

However, the prior-art wireless charging device generally charges other electronic device in one by one manner and the power receiving end 20 is laid down on the wireless charging device. The electronic device cannot be charged by the wireless charging device when the other electronic device is placed on the wireless charging device and still charging. More particularly, the electromagnetic field of the power transmitting end 10 propagates along upward direction as shown in FIG. 1 such that device of the power receiving end 20, which is laid upon the platform of the power transmitting end 10, will receive the electromagnetic field of the power transmitting end 10. The electromagnetic field of the power transmitting end 10 cannot propagate outward unless the platform of the power transmitting end 10 is large enough. However, a large platform of the power transmitting end is bulky and not practical.

SUMMARY OF THE INVENTION

It is the object of the present invention to provide a wireless charging device for charging a plurality of wireless power receiving apparatus and charging method thereof.

According to one aspect of the present invention, the wireless charging device allows the wireless power receiving apparatus to erect, place in landscape, portrait direction or slanting direction and charges the plurality of wireless power receiving apparatus at the same time with reduced volume of the wireless charging device.

Accordingly, the present invention provides a wireless charging device capable of wireless charging a plurality of wireless power receiving apparatus. The wireless charging device comprises at least one transmitting-end ferrite core comprising a bottom plate and two upright plates to form a U-shaped structure, the transmitting-end ferrite core defining a charging space therein to accommodate the plurality of wireless power receiving apparatus; and at least one transmitting-end coil. Each of the wireless power receiving apparatus has a receiving-end coil and a receiving-end ferrite plate and the plurality of wireless power receiving apparatus are arranged in the charging space with the receiving-end ferrite plate vertical to the upright plates of the transmitting-end ferrite core. When electrical current flows through the transmitting-end coil to generate an electromagnetic field in the charging space, the electromagnetic field via the two upright plates goes through each of the receiving-end ferrite plates to form an electromagnetic loop, whereby each of the receiving-end coils generates a charging electrical current induced by the electromagnetic field.

Accordingly, the present invention provides a method for wireless charging. At least one transmitting-end ferrite core and at least one transmitting-end coil are provided, the transmitting-end ferrite core comprising a bottom plate and two upright plates to form a U-shaped structure, the transmitting-end ferrite core defining a charging space therein. At least one wireless power receiving apparatus is placed into the charging space, each of wireless power receiving apparatus having a receiving-end coil and a receiving-end ferrite plate, the receiving-end ferrite plate of the wireless power receiving apparatus being vertical to the upright plates of the transmitting-end ferrite. Electrical current flows through the transmitting-end coil to generate an electromagnetic field in the charging space, the electromagnetic field via the two upright plates transmitting to each of the receiving-end ferrite plates to form an electromagnetic loop, whereby each of the receiving-end coils generates a charging electrical current induced by the electromagnetic field.

According to another aspect of the present invention, the transmitting-end coil comprises at least one concentric spiral planar coil wound on an inner face of the bottom plate and/or at least one the upright plates.

According to still another aspect of the present invention, the wireless power receiving apparatus is parallel to the bottom plate in the charging space, or vertical to the bottom plate in the charging space, or slanting (non-parallel and non-vertical) to bottom plate in the charging space.

According to still another aspect of the present invention, the number of the transmitting-end ferrite core is plural and comprises at least one inner transmitting-end ferrite core and an outer transmitting-end ferrite core, where the inner transmitting-end ferrite core is stacked upon the outer transmitting-end ferrite core. The inner transmitting-end ferrite core has two upright plates and the outer transmitting-end ferrite core has two upright plates longer than the upright plates of the inner transmitting-end ferrite core, the upright plates of the outer transmitting-end ferrite core are bent inward to form L shaped cross section.

According to still another aspect of the present invention, the present invention provides a wireless charging device comprises a transmitting-end ferrite core comprising a bottom plate and an upright plate surrounding the bottom plate to form a barrel-shaped structure with an opened side, the transmitting-end ferrite core defining a charging space therein to accommodate one or more wireless power receiving apparatus; and a first transmitting-end coil arranged on an inner face of the upright plate. Each of the wireless power receiving apparatus has a receiving-end coil and a receiving-end ferrite plate and the plurality of wireless power receiving apparatus are arranged in the charging space. When electrical current flows through the first transmitting-end coil to generate an electromagnetic field in the charging space, each of the receiving-end coils generates a charging electrical current induced by the electromagnetic field.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
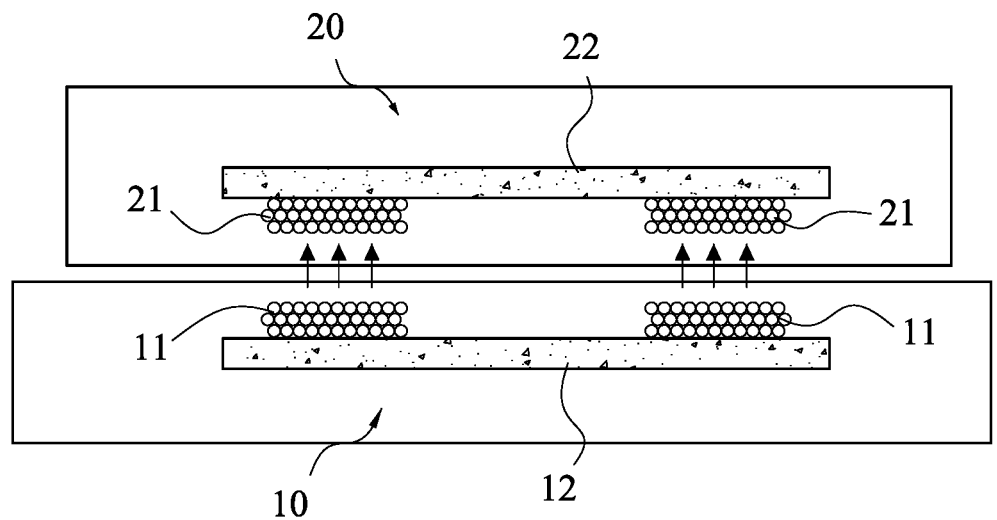
FIG. 1 is a schematic diagram showing the prior-art wireless charging device.
Figure 2:
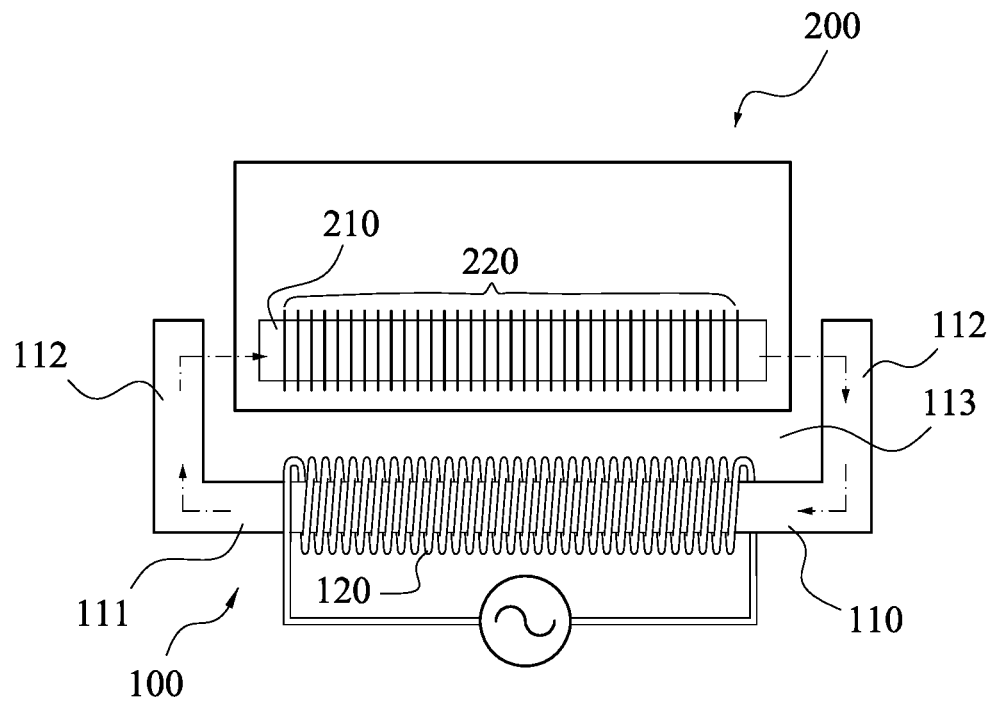
FIG. 2 shows the schematic view of the wireless charging device according to the first embodiment of the present invention.
Figure 3:
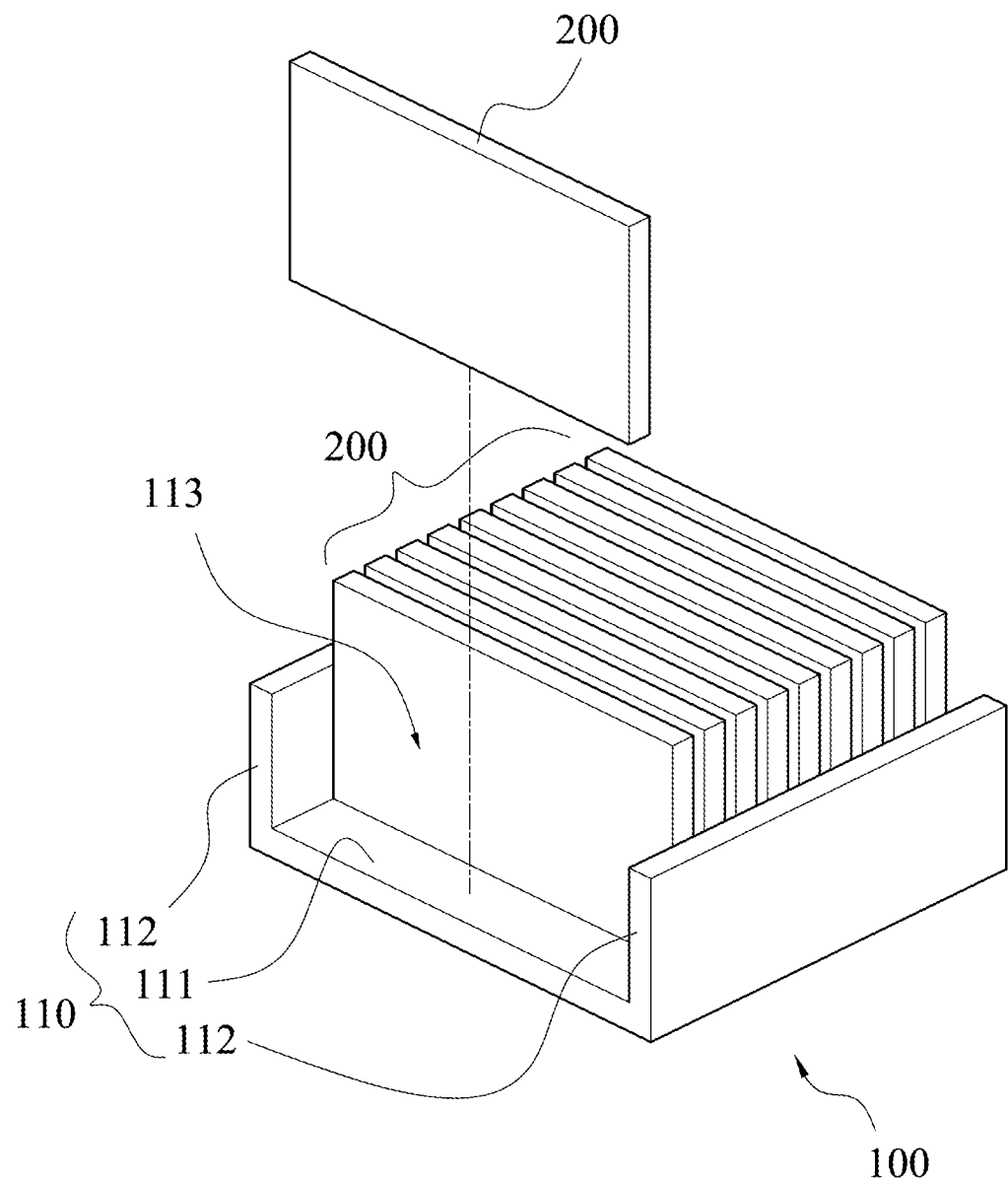
FIG. 3 is the perspective view of the wireless charging device in FIG. 2.

The present invention provides a wireless charging device 100 capable of charging a plurality of wireless power receiving apparatus 200 at the same time, where the wireless power receiving apparatus 200 is portable electronic apparatus such as smart phone or tablet computer, or is wearable device such as smart watch, blue tooth earphone or project glass. FIG. 2 shows the schematic view of the wireless charging device 100 according to the first embodiment of the present invention, and FIG. 3 is the perspective view of the wireless charging device 100 in FIG. 2. The wireless power receiving apparatus 200 comprises a receiving-end ferrite plate 210 and a receiving-end coil 220, both of which are of flat rectangular shape. The transmitting-end ferrite core 110 comprises a bottom plate 111 and two upright plates 112 connected with the bottom plate 111 to form a U shaped structure with a charging space 113 defined by the bottom plate 111 and the upright plates 112. The charging space 113 which is formed between upright plates 112 can accommodate a plurality of wireless power receiving apparatus 200 arranged therein and charged at the same time.

With reference again to FIG. 2, the wireless charging device 100 of the present invention has a U shaped transmitting-end ferrite core 110, and the receiving-end ferrite plate 210 and the receiving-end coil 220 are placed within the charging space 113 surrounded by the two upright plates 112. The receiving-end ferrite plate 210 which is located between the two upright plates 112 is vertical to the two upright plates 112. Electromagnetic field is generated in the charging space 113 when the transmitting-end coil 120 is conducted with electric current. The electromagnetic field is applied to the receiving-end ferrite plate 210 from the two upright plates 112 to form an electromagnetic loop as shown by the dashed arrows in FIG. 2. Therefore, the receiving-end coil 220 has induced current once it receives the electromagnetic field. Each of the receiving-end ferrite plates 210 can form independent loop with the transmitting-end ferrite core 110 and can be charged at the same time. The wireless power receiving apparatus 200 can be charged by the wireless charging device 100 as long as it is located between the two upright plates 112, no matter how far the wireless power receiving apparatus 200 is from the bottom plate 111.

As shown in FIGS. 2 and 3, the wireless power receiving apparatus 200 is placed transversally (namely, in landscape manner) between the two upright plates 112 and is vertical to the bottom plate 111. Moreover, the wireless power receiving apparatus 200 can be placed erectly (namely, in portrait manner) between the two upright plates 112. Alternatively, the wireless power receiving apparatus 200 can be parallel to the bottom plate 111, or slantingly to (non-parallel to or non-vertical to) the bottom plate 111 and between the two upright plates 112, as long as the receiving-end ferrite plate 210 of the wireless power receiving apparatus 200 is vertical to the upright plates 112. In the shown embodiment, the transmitting-end coil 120 can be concentric spiral planar coil wound on the bottom plate 111 or the inner face of one of the two upright plates 112. The number of the transmitting-end coil 120 depends on the number of the wireless power receiving apparatus 200 to be charged. Proved by experiment, the wireless charging device 100 of the present invention can charge at most 50 wireless power receiving apparatus 200 at the same time.

Figure 4:
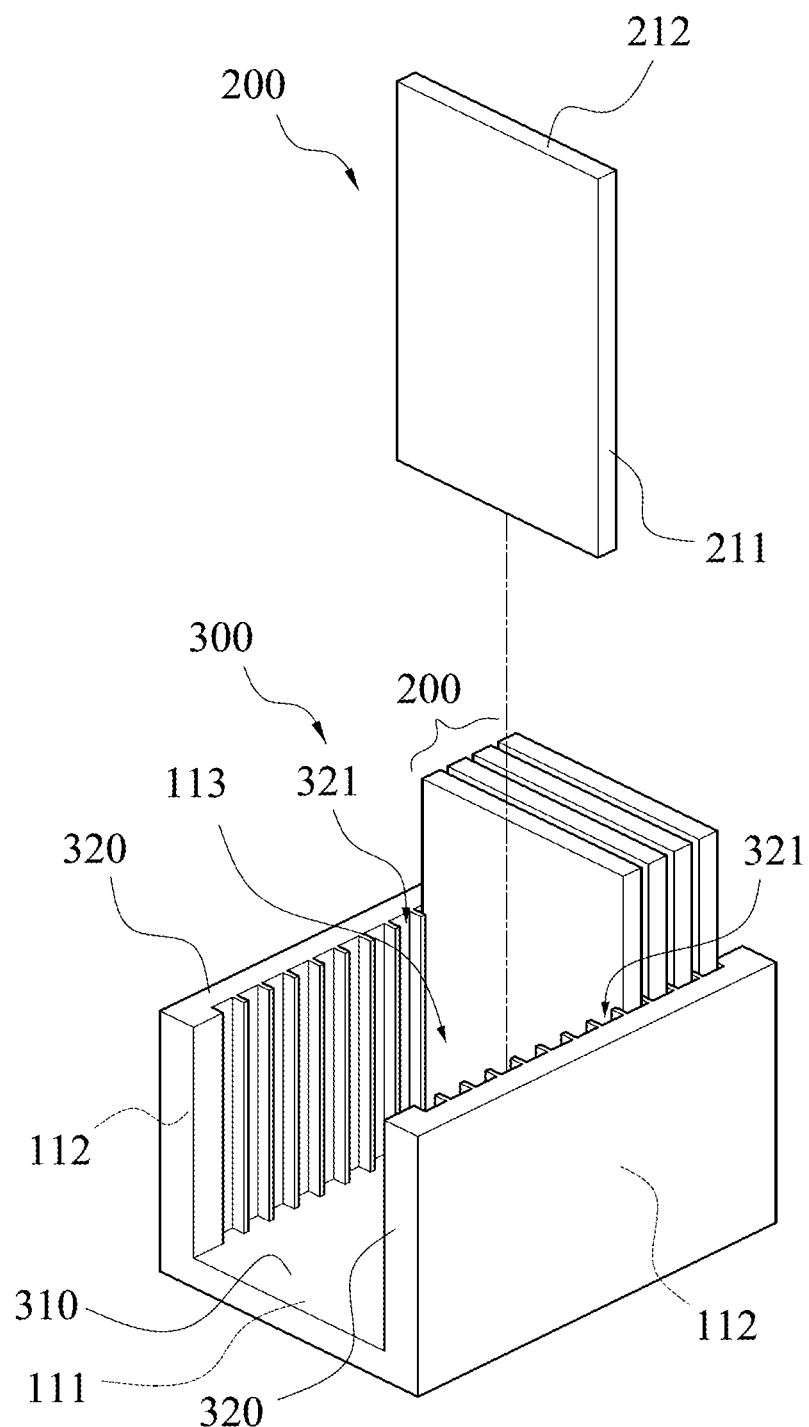
FIG. 4 shows the perspective view of the wireless charging device according to the first embodiment of the present invention.

In order to charge a plurality of wireless power receiving apparatus 200 at the same time with reduced volume, the wireless charging device of the present invention further comprises a charging stage. FIG. 4 shows the perspective view of the wireless charging device according to the first embodiment of the present invention. The wireless charging device of the present invention further comprises a charging stage 300 made of non-metal material. The charging stage 300 has U shaped cross section and has three opened sides. The charging stage 300 has a bottom part 310 and two sidewalls 320 to define the charging space 113 therein. The bottom plate 111 of the transmitting-end ferrite core 110 is arranged on the bottom part 310 of the charging stage 300 and the two upright plates 112 of the transmitting-end ferrite core 110 are respectively arranged on the inner of the two parallel sidewalls 320 of the charging stage 300.

In this embodiment, the two parallel sidewalls 320 respectively have sliding grooves 321 on inner face thereof. The sliding grooves 321 extend from top opened side of the sidewall 320 to the bottom side of the sidewall 320 such that the wireless power receiving apparatus 200 can be arranged into the charging space 113 with the lateral edges thereof fit into the sliding grooves 321. The wireless power receiving apparatus 200 is erectly arranged in the charging space 113 and the wireless power receiving apparatus 200 is also vertical to the two upright plates 112 of the transmitting-end ferrite core 110. The smart phones are of generally thin rectangular shape with a longer side 211 and a shorter side 212. In this embodiment, the longer side 211 is vertical to the bottom plate 111 of the transmitting-end ferrite core 110 while the shorter side 212 is parallel to the bottom plate 111 of the transmitting-end ferrite core 110. Namely, the wireless power receiving apparatus 200 is arranged in the charging stage 300 with the shorter side 212 facing down.

Figure 5:
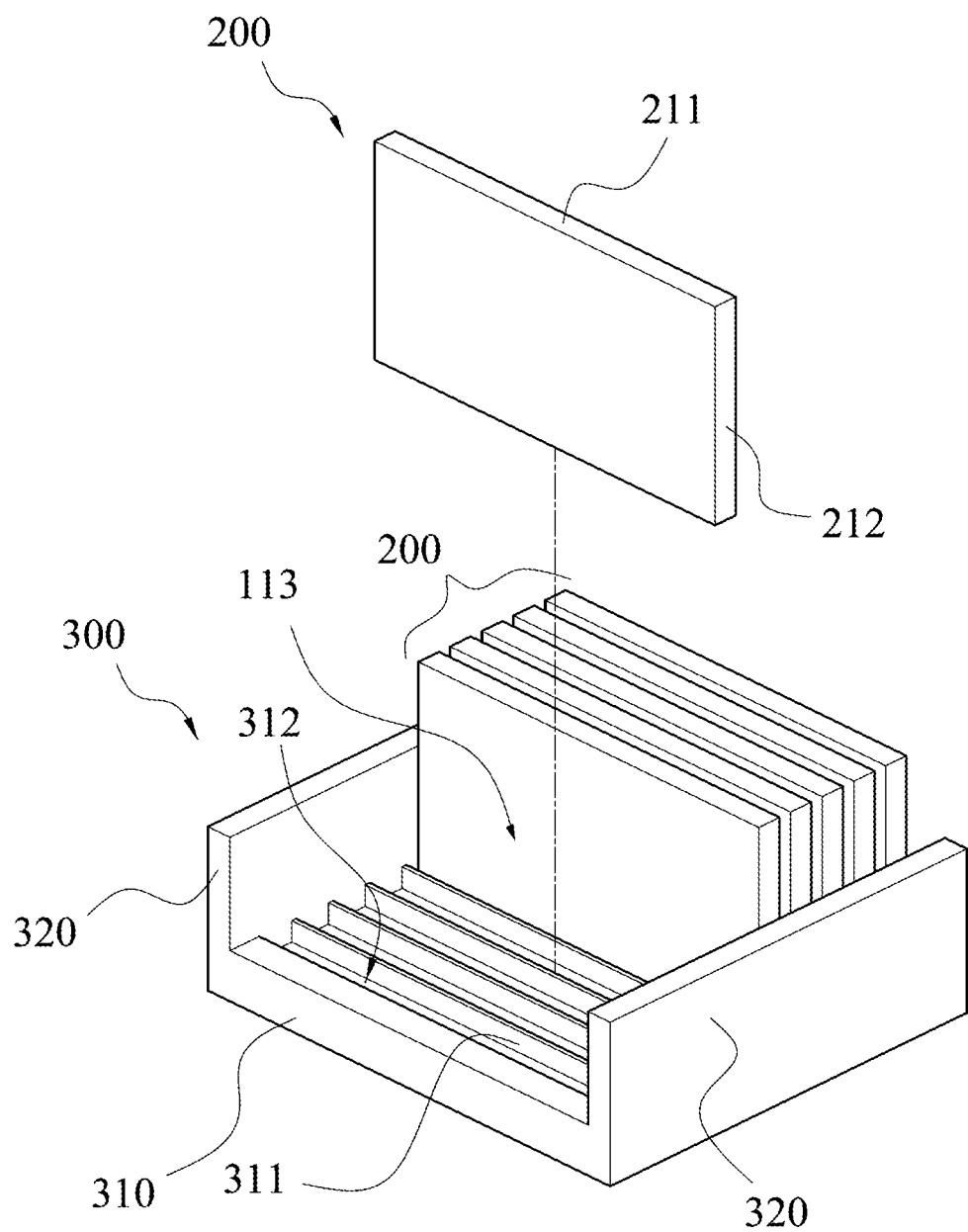
FIG. 5 shows the perspective view of the wireless charging device according to the second embodiment of the present invention.

FIG. 5 shows the perspective view of the wireless charging device 100 according to the second embodiment of the present invention, while FIG. 2 can be viewed as top view of the embodiment shown in FIG. 5. In the embodiment shown in FIG. 5, the charging stage 300 has U shaped cross section and three opened sides. The bottom part 310 of the charging stage 300 has a plurality of ridges 311 to define a plurality of locking grooves 312. When the wireless power receiving apparatus 200 is placed in the charging space 113, one side of the wireless power receiving apparatus 200 is embedded into the locking groove 312 such that the wireless power receiving apparatus 200 is transversally arranged (in landscape manner) in the charging stage 300 and the wireless power receiving apparatus 200 is vertical to two upright plates 112 of the transmitting-end ferrite core 110. In FIG. 5, the shorter side 212 is vertical to the bottom plate 111 of the transmitting-end ferrite core 110 and the longer side 211 is parallel to bottom plate 111 of the transmitting-end ferrite core 110. Namely, the wireless power receiving apparatus 200 is placed in the charging stage 300 with the longer side 211 facing down.

Figure 6:
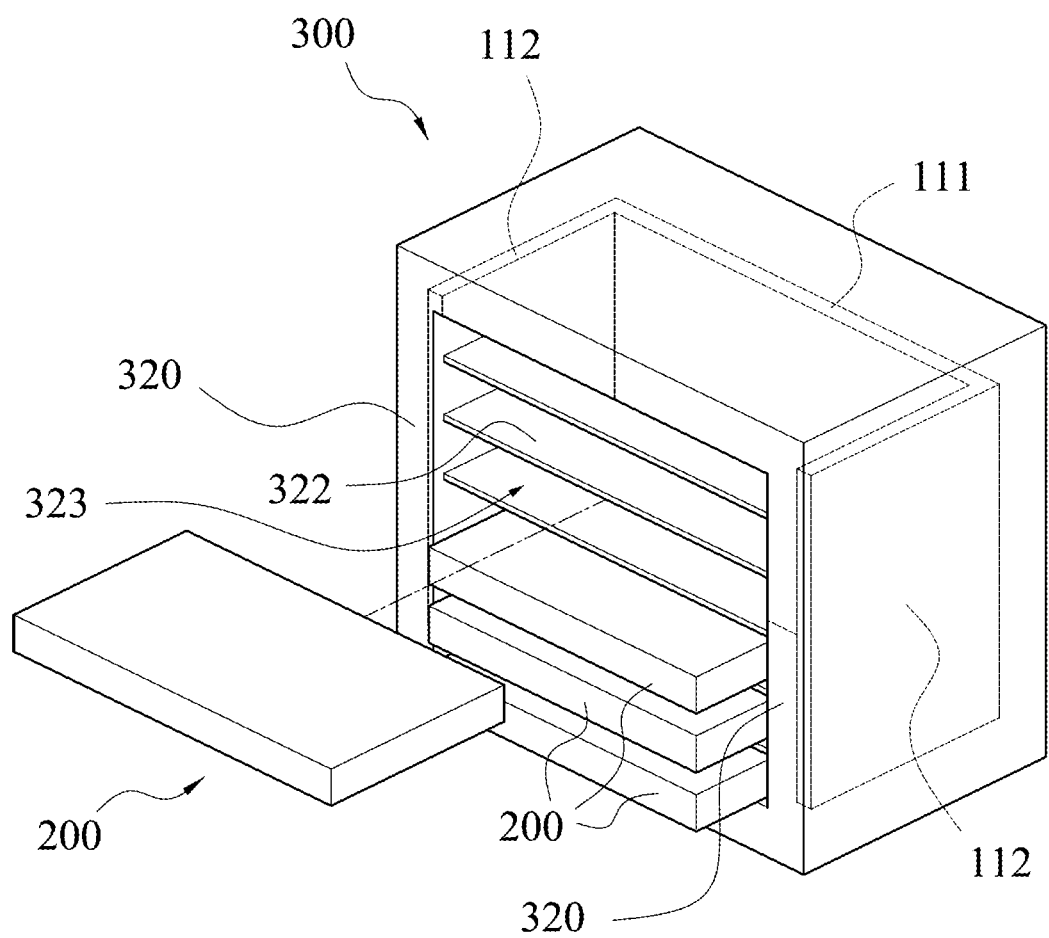
FIG. 6 shows the perspective view of the wireless charging device according to the third embodiment of the present invention.

FIG. 6 shows the perspective view of the wireless charging device 100 according to the third embodiment of the present invention, while FIG. 2 can be viewed as top view of the embodiment shown in FIG. 6. In this embodiment, the charging stage 300 is of box shape with one opened side, where the bottom plate 111 (shown in dashed line) of the transmitting-end ferrite core 110 is arranged on the side opposite to the opened side and the two upright plates 112 (shown in dashed line) are arranged on two parallel sidewalls 320. Each of the sidewalls 320 has a plurality of baffle plates 322 to define a plurality of accommodating slots 323, where each of the accommodating slots 323 can accommodate a wireless power receiving apparatus 200 vertical to the bottom plate 111.

Figure 7:
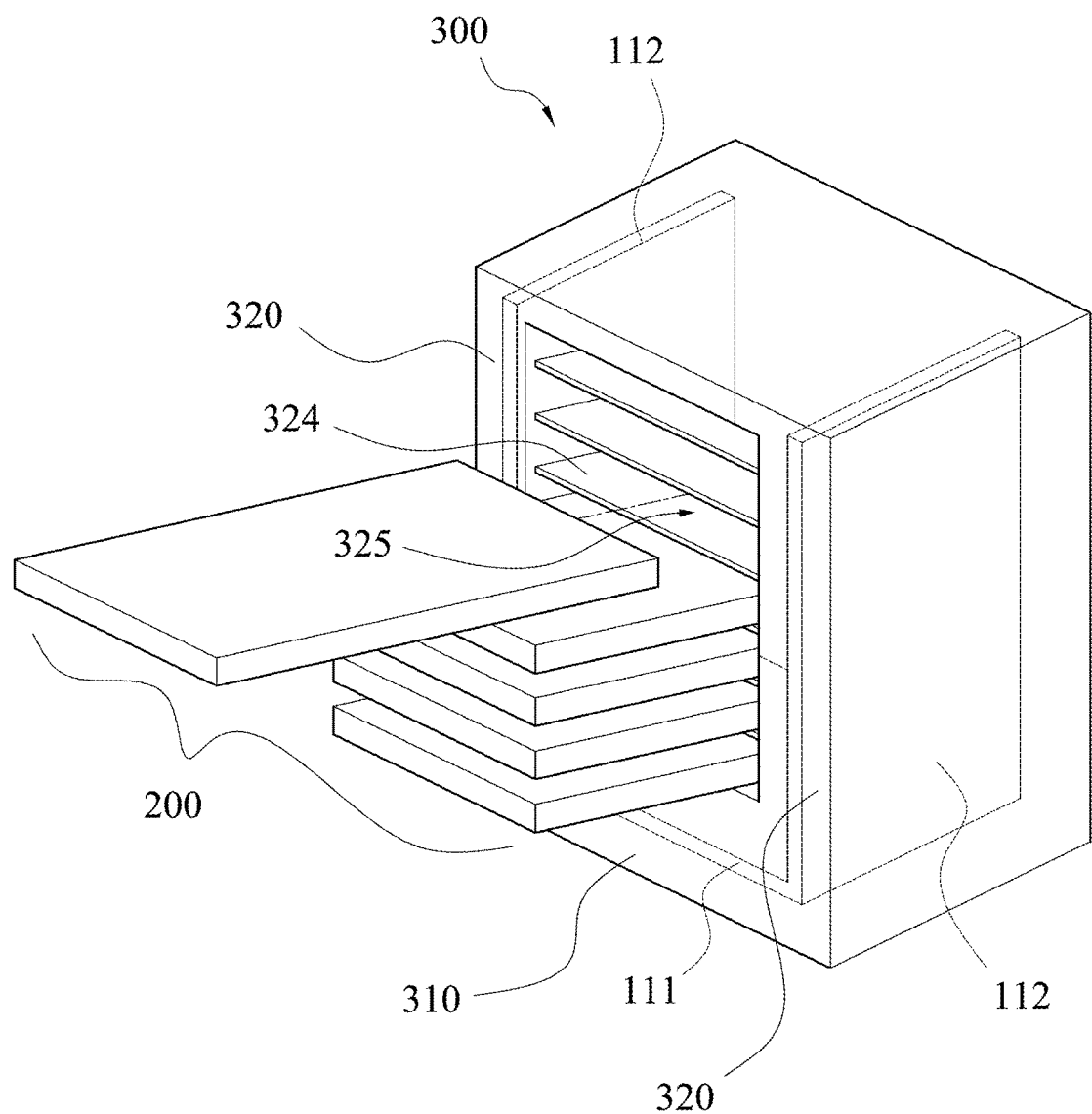
FIG. 7 shows the perspective view of the wireless charging device according to the forth embodiment of the present invention.

FIG. 7 shows the perspective view of the wireless charging device 100 according to the forth embodiment of the present invention. In this embodiment, the charging stage 300 is of box shape with one opened side, where the bottom plate 111 of the transmitting-end ferrite core 110 is arranged on the bottom part 310 of the charging stage 300 and the two upright plates 112 are arranged on two parallel sidewalls 320. Each of the sidewalls 320 has a plurality of slanting baffle plates 324 (parallel to each other) to define a plurality of slanting accommodating slots 325, where each of the slanting accommodating slots 325 is slanting from the opened side of the charging stage 300 to the side opposite to the opened side. When the wireless power receiving apparatus 200 is placed in the slanting accommodating slots 325 of the charging stage 300 for charging, the wireless power receiving apparatus 200 is slantingly arranged in the charging space, namely non-parallel or non-vertical to the bottom plate 111 of the transmitting-end ferrite core 110. However, the wireless power receiving apparatus 200 is still vertical to the two upright plates 112.

Figure 8:
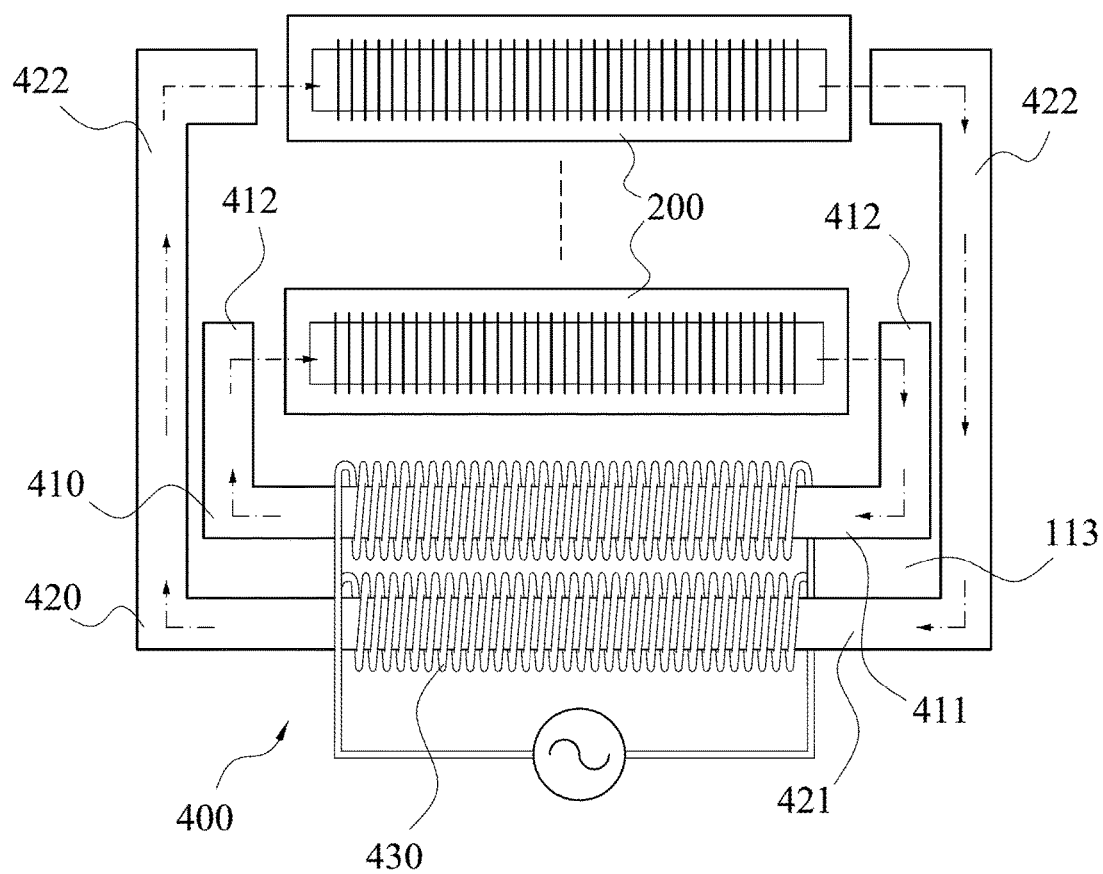
FIG. 8 shows the front view of the wireless charging device according to another embodiment of the present invention.

FIG. 8 shows the front view of the wireless charging device 400 according to another embodiment of the present invention. In this embodiment, the wireless charging device 400 has a plurality of transmitting-end ferrite cores including at least one inner transmitting-end ferrite core 410 and an outer transmitting-end ferrite core 420, where each of the inner transmitting-end ferrite cores 410 and the outer transmitting-end ferrite core 420 has a bottom plate 411, 421 and two upright plates 412, 422 respectively. The inner transmitting-end ferrite cores 410 are stacked in the charging space 113 of the outer transmitting-end ferrite core 420. In the embodiment shown in FIG. 9, there is one inner transmitting-end ferrite core 410 stacked upon the outer transmitting-end ferrite core 420. Moreover, the bottom plate 411 and two upright plates 412 of the inner transmitting-end ferrite core 410 are respectively parallel to the bottom plate 421 and two upright plates 422 of the outer transmitting-end ferrite core 420. In other embodiment (not shown in FIG. 8), the bottom plate and two upright plates of the inner transmitting-end ferrite core can be respectively non-parallel to the bottom plate and two upright plates of the outer transmitting-end ferrite core. Moreover, the number of the inner transmitting-end ferrite core 410 and the outer transmitting-end ferrite core 420, and the stacking manner between the inner transmitting-end ferrite core 410 and the outer transmitting-end ferrite core 420 can also be varied.

In this embodiment shown in FIG. 8, the two upright plates 412 of the inner transmitting-end ferrite core 410 are shorter than the two upright plates 422 of the outer transmitting-end ferrite core 420 and the top portions of the two upright plates 422 of the outer transmitting-end ferrite core 420 are bent inward to form an L-shaped cross section such that the two upright plates 422 of the outer transmitting-end ferrite core 420 can be closer to the wireless power receiving apparatus 200 to be charged. Moreover, the wireless charging device 400 has a plurality of transmitting-end coils 430 and each of the transmitting-end coils 430 is corresponding to one of the inner transmitting-end ferrite core 410 and the outer transmitting-end ferrite core 420. Moreover, the embodiment shown in FIG. 8 can be applied to the charging stages shown in FIGS. 4 to 7, and the detailed description for the application is not described here for brevity.

Figure 9:
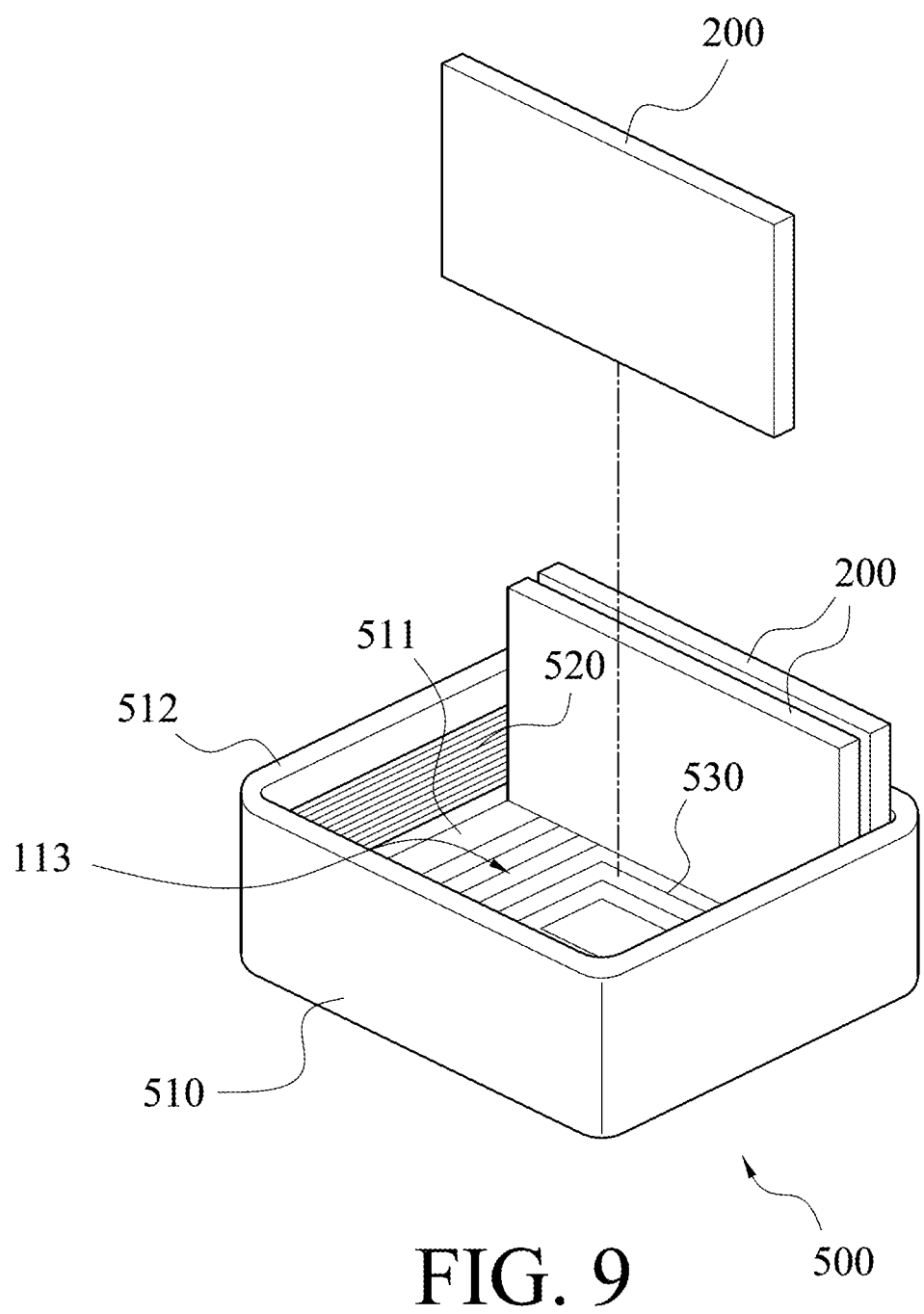
FIG. 9 shows the perspective view of the wireless charging device according to another embodiment of the present invention.

FIG. 9 shows the perspective view of the wireless charging device 500 according to another embodiment of the present invention. In this embodiment, the wireless charging device 500 has a transmitting-end ferrite core 510 and a transmitting-end coil 520, where the transmitting-end ferrite core 510 comprises a bottom plate 511 and at least one upright plate 512 surrounding the peripheral of the bottom plate 511. Therefore, the transmitting-end ferrite core 510 is of barrel shape with one opened side and has a charging space 113. In the embodiment shown in FIG. 9, the upright plate 512 of the transmitting-end ferrite core 510 is of rectangular barrel shape. In other embodiments, the transmitting-end ferrite core 510 can be of circular barrel shape, elliptic barrel shape or polygonal barrel shape with one opened side.

In this embodiment, the first transmitting-end coil 520 surrounds the inner faces of the upright plates 512. An electromagnetic field is generated in the charging space 113 within the upright plate 512 when electric current flows through the first transmitting-end coil 520. The receiving-end coil of the wireless power receiving apparatus 200 will generate charging electric power induced by the electromagnetic field when the wireless power receiving apparatus 200 is placed in the charging space 113. In other word, the wireless power receiving apparatus 200 has induced electric power as long as the wireless power receiving apparatus 200 is placed in a charging space surrounded by the first transmitting-end coil 520 and the transmitting-end ferrite core 510.

In this embodiment, the wireless charging device 500 further comprises a second transmitting-end coil 530 arranged on the bottom plate 511. More particularly, the second transmitting-end coil 530 is a concentric spiral planar coil and wound on inner face of the bottom plate 511. The second transmitting-end coil 530 generates electromagnetic field in the charging space 113 when electric current flows through the second transmitting-end coil 530. The electromagnetic field generated by the second transmitting-end coil 530, together with the electromagnetic field generated by the first transmitting-end coil 520, augments the strength of electromagnetic field in the charging space. The wireless power receiving apparatus 200 has quicker charging time when the wireless power receiving apparatus 200 is placed in the charging space 113 with electromagnetic field from the first transmitting-end coil 520 and the second transmitting-end coil 530.

Figure 10:
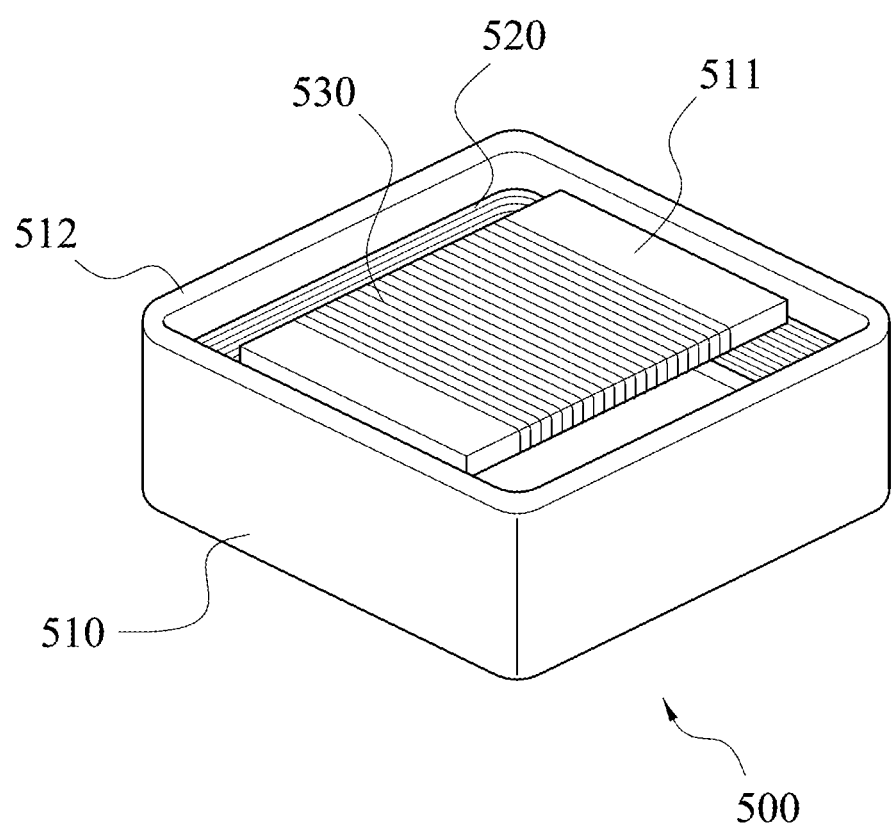
FIG. 10 shows the perspective view of the wireless charging device according to another embodiment of the present invention, which is an inverted version of that shown in FIG. 10.

FIG. 10 shows the perspective view of the wireless charging device 500 according to another embodiment of the present invention, which is an inverted version of that shown in FIG. 9. The bottom plate 511 of the transmitting-end ferrite core 510 is a rectangular ferrite plate and the inner faces of the upright plates 512 are also wound by the first transmitting-end coil 520. The second transmitting-end coil 530 is wound on the outer face of the bottom plate 511. In other word, the charging space 113 of the wireless charging device 500 has augmented electromagnetic field because both the bottom plate 511 and the upright plates 512 of the transmitting-end ferrite core 510 are wound with transmitting-end coil.

In the embodiments shown in FIGS. 9 and 10, the wireless charging device 500 can be arranged in a charging stage (not shown) made of non-metal material. The charging stage has shape corresponding to that of the transmitting-end ferrite core 510. For example, the charging stage can be of rectangular barrel shape, circular barrel shape, elliptic barrel shape or polygonal barrel shape with one opened side. The bottom plate 511 of the transmitting-end ferrite core 510 is also arranged on the bottom part of the charging stage, and the upright plates 512 of the transmitting-end ferrite core 510 are also arranged on the sidewalls of the charging stage. Similarly, the charging space of the charging stage also has a plurality of sliding grooves 321 as those shown in FIG. 4 or a plurality of parallel ridges 311 shown in FIG. 5, or a plurality of baffle plates 322 or slanting baffle plates 32 shown in FIGS. 6 and 7, respectively, such that the wireless power receiving apparatus 200 can be orderly arranged in the charging stage in landscape manner, portrait manner, lying-down manner or slanting manner.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wireless charging device capable of wireless charging a plurality of wireless power receiving apparatus, the wireless charging device comprising:
    at least one transmitting-end ferrite core comprising a bottom plate and two upright plates to form a U-shaped structure, the transmitting-end ferrite core defining a charging space therein to accommodate the plurality of wireless power receiving apparatus,
    wherein the wireless charging device has a plurality of transmitting-end ferrite cores including at least one inner transmitting-end ferrite core and an outer transmitting-end ferrite core, the inner transmitting-end ferrite core is stacked on the outer transmitting-end ferrite core, the inner transmitting-end ferrite core has two upright plates and the outer transmitting-end ferrite core has two upright plates longer than the upright plates of the inner transmitting-end ferrite core; and
    at least one transmitting-end coil,
    wherein each of the wireless power receiving apparatus has a receiving-end coil and a receiving-end ferrite plate and the plurality of wireless power receiving apparatus are arranged in the charging space vertical to the upright plates of the transmitting-end ferrite core;
    when electrical current flows through the transmitting-end coil to generate an electromagnetic field in the charging space, the electromagnetic field via the two upright plates goes through each of the receiving-end ferrite plates to form an electromagnetic loop, whereby each of the receiving-end coils generates a charging electrical current induced by the electromagnetic field.

2. The wireless charging device in claim 1, wherein the transmitting-end coil comprises at least one concentric spiral planar coil wound on an inner face of the bottom plate and/or at least one the upright plates.

3. The wireless charging device in claim 1, wherein the wireless power receiving apparatus is arranged in the charging space and parallel to the bottom plate.

4. The wireless charging device in claim 1, wherein the wireless power receiving apparatus is arranged in the charging space and vertical to the bottom plate.

5. The wireless charging device in claim 4, wherein the wireless power receiving apparatus has a longer side and a shorter side and the wireless power receiving apparatus is arranged in the charging space with the longer side vertical to the bottom plate.

6. The wireless charging device in claim 4, wherein the wireless power receiving apparatus has a longer side and a shorter side and the wireless power receiving apparatus is arranged in the charging space with the shorter side vertical to the bottom plate.

7. The wireless charging device in claim 1, wherein the wireless power receiving apparatus is arranged in the charging space and non-parallel or non-vertical or slanting to the bottom plate.

8. The wireless charging device in claim 1, wherein the upright plates of the outer transmitting-end ferrite core are bent inward to form L shaped cross section.

9. The wireless charging device in claim 1, wherein the wireless charging device has a plurality of transmitting-end ferrite coils and each of the transmitting-end ferrite coils is corresponding to one transmitting-end ferrite core.

10. The wireless charging device in claim 1, further comprising a charging stage made of non-metal material and being of box shape with one opened side, the charging stage having a bottom part and two sidewalls, the bottom plate and the upright plates of the transmitting-end ferrite core are respectively arranged on the bottom part and the sidewalls of the charging stage.

11. The wireless charging device in claim 10, wherein the charging stage has a plurality of parallel baffle plates to define a plurality of accommodating slots, each of the accommodating slot accommodates wireless power receiving apparatus.

12. The wireless charging device in claim 10, wherein each of the upright plates of the charging stage has a plurality of sliding grooves extended from the opened side to the bottom plate, the wireless power receiving apparatus is arranged into the charging space with lateral edges thereof fit into the sliding grooves.

13. The wireless charging device in claim 10, wherein bottom part of the charging stage has a plurality of parallel ridges to define a plurality of locking grooves on inner face of the bottom plate, the wireless power receiving apparatus is placed in the charging space with one side of the wireless power receiving apparatus embedded into the locking groove and the wireless power receiving apparatus is erected in the charging space.

14. A method for wireless charging, comprising:
providing at least one transmitting-end ferrite core and at least one transmitting-end coil, the transmitting-end ferrite core comprising a bottom plate and two upright plates to form a U-shaped structure, the transmitting-end ferrite core defining a charging space therein, wherein the wireless charging device has a plurality of transmitting-end ferrite cores including at least one inner transmitting-end ferrite core and an outer transmitting-end ferrite core, the inner transmitting-end ferrite core is stacked on the outer transmitting-end ferrite core, the inner transmitting-end ferrite core has two upright plates and the outer transmitting-end ferrite core has two upright plates longer than the upright plates of the inner transmitting-end ferrite core;
placing at least one wireless power receiving apparatus into the charging space, each of wireless power receiving apparatus having a receiving-end coil and a receiving-end ferrite plate, the receiving-end ferrite plate of the wireless power receiving apparatus being vertical to the upright plates of the transmitting-end ferrite; and
conducing electrical current flowing through the transmitting-end coil to generate an electromagnetic field in the charging space, the electromagnetic field via the two upright plates goes through each of the receiving-end ferrite plates to form an electromagnetic loop, whereby each of the receiving-end coils generates a charging electrical current induced by the electromagnetic field.

15. The method in claim 14, wherein the transmitting-end coil comprises at least one concentric spiral planar coil wound on an inner face of the bottom plate and/or at least one the upright plates.

16. The method in claim 14, wherein the wireless power receiving apparatus is arranged in the charging space and parallel to the bottom plate.

17. The method in claim 14, wherein the wireless power receiving apparatus is arranged in the charging space and vertical to the bottom plate.

18. The method in claim 17, wherein the wireless power receiving apparatus has a longer side and a shorter side and the wireless power receiving apparatus is arranged in the charging space with the longer side vertical to the bottom plate.

19. The method in claim 17, wherein the wireless power receiving apparatus has a longer side and a shorter side and the wireless power receiving apparatus is arranged in the charging space with the shorter side vertical to the bottom plate.

20. The method in claim 14, wherein the wireless power receiving apparatus is arranged in the charging space and non-parallel or non-vertical or slanting to the bottom plate.

21. The method in claim 14, wherein the upright plates of the outer transmitting-end ferrite core are bent inward to form L shaped cross section.

22. The method in claim 14, wherein the wireless charging device has a plurality of transmitting-end ferrite coils and each of the transmitting-end ferrite coils is corresponding to one transmitting-end ferrite core.

23. A wireless charging device capable of wireless charging a plurality of wireless power receiving apparatus, the wireless charging device comprising:
a transmitting-end ferrite core comprising a bottom plate and an upright plate surrounding the bottom plate to form a barrel-shaped structure with an opened side, the transmitting-end ferrite core defining a charging space therein to accommodate one or more wireless power receiving apparatus; and
a first transmitting-end coil arranged on an inner face of the upright plate;
wherein each of the wireless power receiving apparatus has a receiving-end coil and a receiving-end ferrite plate and the plurality of wireless power receiving apparatus are arranged in the charging space;
when electrical current flows through the first transmitting-end coil to generate an electromagnetic field in the charging space, each of the receiving-end coils generates a charging electrical current induced by the electromagnetic field.

24. The wireless charging device in 23, wherein the wireless power receiving apparatus is placed in arbitrary position in the charging space.

25. The wireless charging device in 23, further comprising a charging stage made of non-metal material and being of box shape with one opened side, the charging stage having a bottom part and two sidewalls, the bottom plate and the upright plates of the transmitting-end ferrite core are respectively arranged on the bottom part and the sidewalls of the charging stage.

26. The wireless charging device in 25, wherein the first transmitting-end coil is of rectangular box shape with one opened side and corresponding to the charging stage.

27. The wireless charging device in 25, wherein the first transmitting-end coil is of circular or elliptic box shape with one opened side and corresponding to the charging stage.

28. The wireless charging device in 23, further comprising:
a second transmitting-end coil arranged on the bottom plate, the second transmitting-end coil generating electromagnetic field in the charging space when electric current flows through the second transmitting-end coil, whereby the receiving-end coils generates a charging electrical current induced by the electromagnetic field of the second transmitting-end coil.

29. The wireless charging device in 28, wherein the bottom plate is a rectangular ferrite plate and the second transmitting-end coil is wound on an outer face of the bottom plate.

30. A method for wireless charging, comprising:
providing a transmitting-end ferrite core and a first transmitting-end coil, the transmitting-end ferrite core comprising a bottom plate and an upright plate surrounding the bottom plate to form a barrel-shaped structure with an opened side, the transmitting-end ferrite core defining a charging space therein, the first transmitting-end coil arranged on an inner face of the upright plate;
placing one or more wireless power receiving apparatus into the charging space, each of wireless power receiving apparatus having a receiving-end coil and a receiving-end ferrite plate; and
conducing electrical current to the first transmitting-end coil to generate an electromagnetic field in the charging space, each of the receiving-end coils generating a charging electrical current induced by the electromagnetic field.

31. The method in claim 30, wherein the wireless power receiving apparatus is placed in arbitrary position in the charging space.

32. The method in claim 30, wherein the first transmitting-end coil is of rectangular box shape with one opened side and corresponding to the charging stage.

33. The method in claim 30, wherein the first transmitting-end coil is of circular or elliptic box shape with one opened side and corresponding to the charging stage.

34. The method in claim 30, further comprising:
Providing a second transmitting-end coil arranged on the bottom plate; and
Conducting electric current to the second transmitting-end coil to generate electromagnetic field in the charging space, whereby the receiving-end coils generates a charging electrical current induced by the electromagnetic field of the second transmitting-end coil.

35. The method in claim 34, wherein the bottom plate is a rectangular ferrite plate and the second transmitting-end coil is wound on an outer face of the bottom plate.

* * * * *